(12) United States Patent
Lee

(10) Patent No.: US 9,140,315 B2
(45) Date of Patent: Sep. 22, 2015

(54) BIMETAL FAN CLUTCH WITH OIL STORAGE FORMED IN ROTOR

(71) Applicant: Hyundai Motor Company, Seoul (KR)

(72) Inventor: Seonmin Lee, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 77 days.

(21) Appl. No.: 14/015,705

(22) Filed: Aug. 30, 2013

(65) Prior Publication Data

US 2014/0360833 A1 Dec. 11, 2014

(30) Foreign Application Priority Data

Jun. 7, 2013 (KR) .................. 10-2013-0065327

(51) Int. Cl.
*F16D 35/02* (2006.01)

(52) U.S. Cl.
CPC .................... *F16D 35/023* (2013.01)

(58) Field of Classification Search
CPC ............... F16D 35/023; F16D 35/022
USPC ....................... 192/58.681–58.684
See application file for complete search history.

(56) References Cited

U.S. PATENT DOCUMENTS

| 4,281,750 | A | * | 8/1981 | Clancey | 192/58.682 |
| 4,850,465 | A | * | 7/1989 | Ono | 192/58.682 |
| 5,601,170 | A | * | 2/1997 | Martin et al. | 192/58.681 |
| 6,032,775 | A | * | 3/2000 | Martin | 192/58.61 |

FOREIGN PATENT DOCUMENTS

| JP | 04-219530 A | 8/1992 |
| JP | 11-062585 A | 3/1999 |
| JP | 2008-249137 A | 10/2008 |
| KR | 1998-028802 A | 7/1998 |
| KR | 20040000080 A | 1/2004 |
| KR | 20090058654 A | 6/2009 |
| KR | 20090110645 A | 10/2009 |
| KR | 10-2010-0011279 A | 2/2010 |

* cited by examiner

*Primary Examiner* — Terry Chau
(74) *Attorney, Agent, or Firm* — Morgan, Lewis & Bockius LLP

(57) ABSTRACT

A bimetal fan clutch may include a disc-shaped rotor that is affixed to a shaft coupled with an engine between a lower case fixed to the shaft via a bearing and an upper case covering the lower case and having a space, an oil storage that is attached to one face of the rotor to be housed in the space and has a projection inserted into a central hollow part formed in the upper case, a bimetal oil valve that is provided inside the oil storage, wherein the bimetal oil valve changes its shape in response to heat transferred through a bimetal assembly mounted through the projection and thereby opens/closes a through-hole formed in the oil storage, and a return line that is formed in the lower case so that oil ejected to the space through the through-hole is collected into the oil storage.

7 Claims, 3 Drawing Sheets

BIMETAL FAN CLUTCH WITH OIL STORAGE FORMED IN ROTOR

CROSS-REFERENCE(S) TO RELATED APPLICATIONS

The present application claims priority of Korean Patent Application Number 10-2013-0065327 filed on Jun. 7, 2013, the entire contents of which application are incorporated herein for all purposes by this reference.

BACKGROUND OF INVENTION

1. Field of Invention

The present invention relates to a fan clutch and, particularly, to a bimetal fan clutch with an oil storage formed in or attached to a rotor, to improve a reaction speed.

2. Description of Related Art

Cooling fans are devices that are mounted around a radiator and produce a current of air toward a radiator in order to accelerate cooling of a coolant flowing through the radiator.

Such a cooling fan is mounted with a fan clutch that rotates the cooling fan when a temperature of the radiator is increased beyond an adequate or proper value while receiving power from an engine.

Generally, the fan clutch is designed so that heat of the coolant can be transferred to a bimetal, and oil is introduced and pressurized between a case and a rotor according to a change in shape of the bimetal due to the heat transfer to cause the case to be synchronized with rotation of the rotor.

However, this fan clutch has a drawback in that a reaction speed is slow because it takes time for the oil to be introduced and pressurized.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to a bimetal fan clutch in which the oil storage is formed in a rotor, and oil is sprayed and supplied between the rotor and a case by a centrifugal force caused by rotation of the rotor to improve a reaction speed.

In accordance with various aspects of the present invention, a bimetal fan clutch with an oil storage formed in a rotor may include a disc-shaped rotor that is fixedly mounted to a shaft coupled with an engine between a lower case fixed to the shaft via a bearing and an upper case covering the lower case and having a space formed therein, an oil storage that is attached to one face of the rotor to be housed in the space and has a projection inserted into a central hollow part formed in the upper case, a bimetal oil valve that is provided inside the oil storage, wherein the bimetal oil valve changes its shape in response to heat transferred through a bimetal assembly mounted through the projection and thereby opens/closes a through-hole formed in the oil storage, and a return line that is formed in the lower case so that oil ejected to the space through the through-hole is collected into the oil storage.

In accordance with various other aspects of the present invention, the lower case may include lower grooves having a central axis that is the same as the shaft, and the upper case may include upper grooves having a central axis that is the same as the central hollow part. The rotor may include uneven parts formed on opposite faces thereof so as not to be in contact with the upper and lower grooves. The oil introduced into the space through the through-hole may act as a frictional material between the upper case and the rotor and between the lower case and the rotor, and the upper and lower cases are rotated in proportion to rotation of the shaft. The lower case may include a discharge line extending outward from the return line, and the discharge line may be blocked by a steel ball inserted thereinto. The rotor may include a collecting hole adjacent to the shaft.

In accordance with still various other aspects of the present invention, the return line may include that is adjacent to and substantially perpendicular to a circumference of the rotor and is formed by drilling the lower case to a predetermined depth, a return tunnel that extends from the first return hole toward the shaft, and a second return hole that is drilled from the return tunnel toward the collecting hole. The oil storage may have a shape of a box whose lower side is opened, and the oil storage may include a projection at a closed upper side thereof and a flange formed at the opened lower side at a predetermined width and in close contact with the rotor. The oil storage may be fastened to the rotor by bolts passing through the flange and fastening holes formed in the rotor.

According to the present invention, since the oil storage is attached to the rotor, the oil is ejected in a circumferential direction of the rotor under a centrifugal force and is increased in pressure when supplied. Thus, the oil is pressurized, and a reaction speed of the bimetal fan clutch is improved Further, the reaction speed is improved, and the upper and lower cases rapidly reach target revolutions per minute. As such, an operation starting temperature of the fan clutch can be increased. Thus, power consumption is reduced, and fuel efficiency is improved.

Further, since the oil is collected into the oil storage through the return line, the revolutions per minute in an idle state of the fan clutch is minimized. Thus, the fuel efficiency is improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
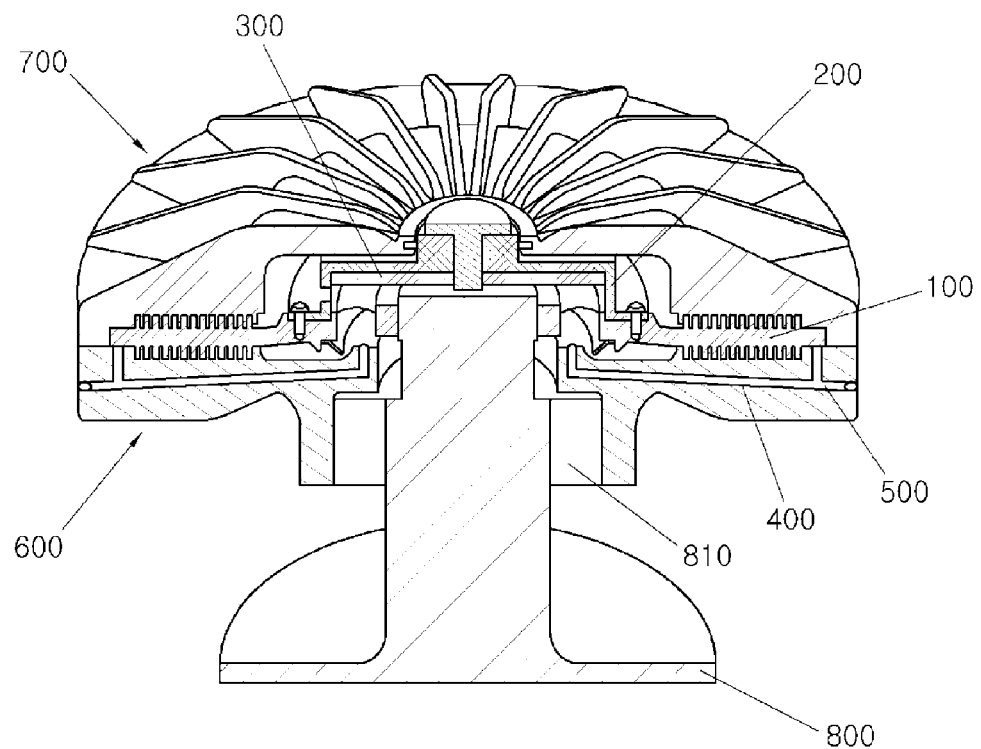
FIG. 1 is a cross-sectional perspective view showing essential parts of a bimetal fan clutch with an oil storage formed in a rotor in accordance with the present invention.

As shown in FIG. 1, a bimetal fan clutch with an oil storage formed in a rotor in accordance with various embodiments of the present invention includes a disc-shaped rotor 100, an oil storage 200, a bimetal oil valve 300 and a return line 400. The disc-shaped rotor 100 is fixedly restricted or mounted to a shaft 800 coupled with an engine to be located between a lower case 600 fixed to the shaft 800 via a bearing 810 without being restricted and an upper case 700 covering the lower case 600 and having a space 710 formed therein. The oil storage 200 is attached to one face of the rotor 100 to be housed in the space 710 and is provided with a projection 210 inserted into a central hollow part 720 formed in the upper case 700. The bimetal oil valve 300, the shape of which can be changed by heat transferred through a bimetal assembly 310 mounted through the projection 210, is provided inside the oil storage 200 to open/close a through-hole 220 formed in the oil storage 200. The return line 400 is formed in the lower case 600 so that oil ejected to the space 710 through the through-hole 220 is collected into the oil storage 200.

Further, the oil ejected to the space 710 through the through-hole 220 is interposed and pressurized among the upper case 700, the lower case 600, and the rotor 100, and thereby the upper case 700 and the lower case 600 are rotated in proportion to rotation of the shaft 800.

Figure 2:
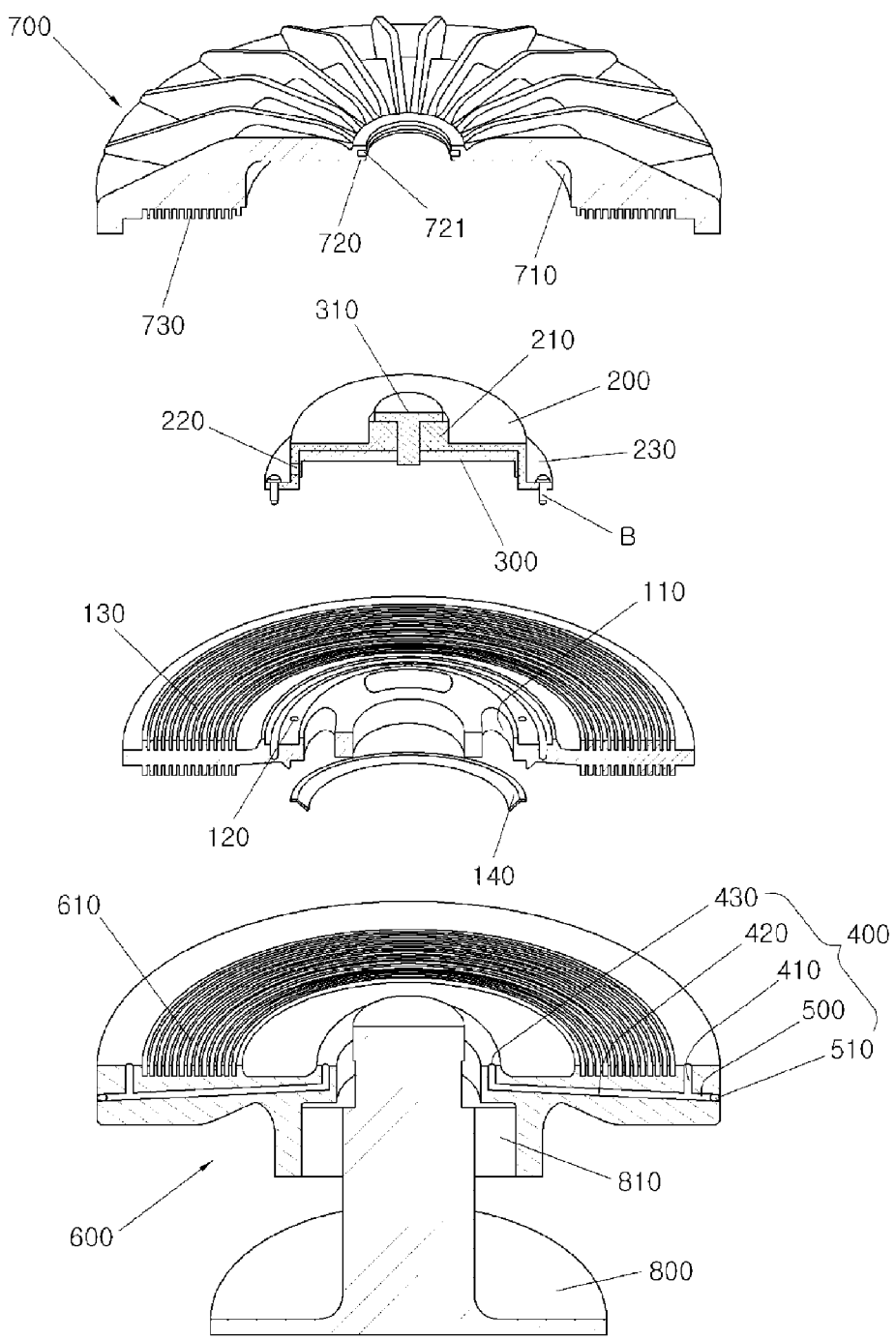
FIG. 2 is an exploded perspective view showing the bimetal fan clutch with an oil storage formed in a rotor shown in FIG. 1.
Figure 3:
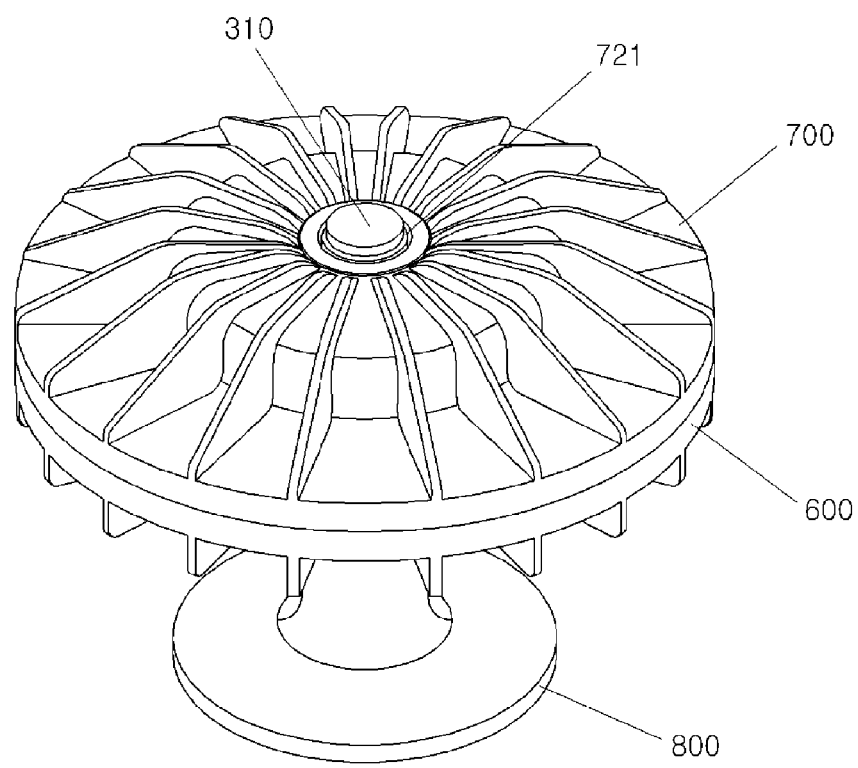
FIG. 3 is a perspective view showing the bimetal fan clutch with an oil storage formed in a rotor shown in FIG. 1.

As shown in FIGS. 2 and 3, in various embodiments of the present invention, the lower case 600 and the upper case 700 are provided with a plurality of upper grooves 730 and a plurality of lower grooves 610 that face each other and are formed substantially at regular intervals. The rotor 100 is provided with uneven parts 130 on opposite faces thereof so as not to be in contact with the upper grooves 730 and the lower grooves 610.

The upper grooves 730 and the lower grooves 610 are formed in the upper case 700 and the lower case 600 in an annual ring shape to form the same center as the shaft 800 adopting the central axis of the shaft 800 as an origin. Here, the upper grooves 730 and the lower grooves 610 are formed to be substantially symmetrical with respect to the rotor 100.

This is intended to prevent the oil, which is interposed among the upper grooves 730, the lower grooves 610, and the uneven parts 130, from rapidly leaning to a circumference of the rotor 100 by a centrifugal force.

Further, in various embodiments of the present invention, a rubber seal 721 is provided in the central hollow part 720 formed in the upper case 700. The rubber seal 721 is formed along a circumference of the central hollow part 720 and blocks a gap between the projection 210 inserted into the central hollow part 720 and the central hollow part 720. Thereby, the oil is prevented from being discharged outside through the central hollow part 720.

Further, the upper case 700 is coupled to the lower case 600 by screwing or curling. In various embodiments, the upper case 700 is coupled to the lower case 600 by screwing.

Further, as shown in FIG. 2, the rotor 100 is provided with a collecting hole 110 adjacent to the shaft 800. The return line 400 includes a first return hole 410 that is formed to be adjacent to and substantially perpendicular to the circumference of the rotor 100 by drilling the lower case 600 to a predetermined depth, a return tunnel 420 that extends from the first return hole 410 toward the shaft 800, and a second return hole 430 that is drilled from the return tunnel 420 toward the collecting hole 110. Since the collecting hole 110 is formed, the oil circulating through the return line 400 flows into the oil storage 200.

Further, a cover ring 140 is interposed between the lower case 600 and the rotor 100 to prevent the oil from leaking from the gap between the lower case 600 and the rotor 100.

Further, in various embodiments of the present invention, the lower case 600 is provided with a discharge line 500 that extends outward from the return tunnel 420. The discharge line 500 is blocked by a steel ball 510 inserted thereinto.

Since the discharge line 500 is formed, it has an effect that is able to readily discharge deteriorated oil whose viscosity is lower or higher than a reference value to the outside and inject oil whose viscosity is an adequate or proper value again.

The steel ball 510 may be formed of the same material as the lower case 600 or a high-strength material, and is insensitive to deformation caused by heat.

In various embodiments of the present invention, the oil storage 200 has the shape of a box that is closed at an upper side and is opened at a lower side, and is provided with a projection 210 at the closed upper side and a flange 230 that is in close contact with the rotor 100 at the opened lower side.

Further, one through-hole 220 is formed in a sidewall. In some cases, a plurality of through-holes 220 may be formed. When a plurality of through-holes 220 are formed, a plurality of bimetal oil valves 300 may be provided to correspond to all the through-holes 220 and open/close the respective through-holes 220.

Bolts B passing through the flange 230 are fastened to fastening holes 120 formed in the rotor 100, and thereby the oil storage 200 is attached to the rotor 100.

The bimetal assembly 310 of a cylindrical shape is mounted through the projection 210. The bimetal assembly 310 is designed so that one lengthwise side thereof protrudes outward through the central hollow part 720 of the upper case 700 and the other lengthwise side thereof protrudes into the oil storage 200.

The heat of the coolant is transferred to one side of the bimetal assembly 310 protruding outside the upper case 700. Materials or constitutions for transferring the heat of the coolant are known in the art, and description thereof will be omitted.

Further, the bimetal oil valve 300 is attached to the other lengthwise side of the bimetal assembly 310 which protrudes into the oil storage 200. The bimetal oil valve 300 changes its shape in response to the heat transferred through the bimetal assembly 310 and thus opens/closes the through-hole 220 formed in the oil storage 200.

The bimetal oil valve 300 is slightly shorter than a width of the oil storage 200 and is provided with bent blocking plates such as vertically bent blocking plates at opposite ends thereof. While the blocking plates close the through-hole 220, the bimetal oil valve 300 is deformed in shape by the heat transferred through the bimetal assembly 310, and thereby the blocking plates are displaced to open the through-hole 220.

In various embodiments of the present invention, as the bimetal oil valve 300 is changed in shape to open the through-hole 220, the oil is rapidly diffused from the oil storage 200 formed in the rotor 100 in a circumferential direction of the rotor 100. The diffused oil acts as a frictional material between the upper case 700 and the rotor 100 and between the lower case 600 and the rotor 100. As the rotor 100 is rotated, the upper case 700 and the lower case 600 are rotated within a relatively short time, and the bimetal oil valve 300 is changed in shape to close the through-hole 220. Thus, the oil is no longer supplied, and the oil supplied previously leans in the circumferential direction of the rotor 100 by the centrifugal force and is collected into the oil storage 200 through the return line 400. Thereby, the frictional material between the upper case 700 and the rotor 100 and between the lower case 600 and the rotor 100 is removed, and thus the rotation of the rotor becomes slow within a short time.

For convenience in explanation and accurate definition in the appended claims, the terms "upper" or "lower", inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bimetal fan clutch with an oil storage formed in a disc-shaped rotor comprising:
   the disc-shaped rotor that is affixed to a shaft coupled with an engine between a lower case fixed to the shaft via a bearing and an upper case covering the lower case and having a space formed therein;
   the oil storage that is attached to one face of the rotor to be housed in the space and has a projection inserted into a central hollow part formed in the upper case;
   a bimetal oil valve that is provided inside the oil storage, wherein the bimetal oil valve changes its shape in response to heat transferred through a bimetal assembly mounted through the projection and thereby opens/closes a through-hole formed in the oil storage; and
   a return line that is formed in the lower case so that oil ejected to the space through the through-hole is collected into the oil storage,
   wherein the lower case includes a discharge line extending outward from the return line, and the discharge line is blocked by a steel ball inserted thereinto.

2. The bimetal fan clutch of claim 1, wherein the lower case includes lower grooves having a central axis that is the same as the shaft, the upper case includes upper grooves having a central axis that is the same as the shaft, and the rotor includes uneven parts formed on opposite faces thereof so as not to be in contact with the upper and lower grooves.

3. The bimetal fan clutch of claim 1, wherein the oil introduced into the space through the through-hole acts as a frictional material between the upper case and the rotor and between the lower case and the rotor, and the upper and lower cases are rotated in proportion to rotation of the shaft.

4. The bimetal fan clutch of claim 1, wherein the rotor includes a collecting hole adjacent to the shaft.

5. The bimetal fan clutch of claim 1, wherein the oil storage has a shape of a cylinder whose lower side is opened, and the oil storage includes the projection at a closed upper side thereof and a flange formed at the opened lower side at a predetermined width and in close contact with the rotor.

6. The bimetal fan clutch of claim 5, wherein the oil storage is fastened to the rotor by bolts passing through the flange and fastening holes formed in the rotor.

7. A bimetal fan clutch with an oil storage formed in a disc-shaped rotor comprising:
   the disc-shaped rotor that is affixed to a shaft coupled with an engine between a lower case fixed to the shaft via a bearing and an upper case covering the lower case and having a space formed therein;
   the oil storage that is attached to one face of the rotor to be housed in the space and has a projection inserted into a central hollow part formed in the upper case;
   a bimetal oil valve that is provided inside the oil storage, wherein the bimetal oil valve changes its shape in response to heat transferred through a bimetal assembly mounted through the projection and thereby opens/closes a through-hole formed in the oil storage; and
   a return line that is formed in the lower case so that oil ejected to the space through the through-hole is collected into the oil storage,
   wherein the rotor includes a collecting hole adjacent to the shaft, and
   wherein the return line includes a first return hole that is adjacent to and substantially perpendicular to a circumference of the rotor and is formed by drilling the lower case to a predetermined depth, a return tunnel that extends from the first return hole toward the shaft, and a second return hole that is drilled from the return tunnel toward the collecting hole.

* * * * *